United States Patent [19]

Wada et al.

[11] Patent Number: 4,738,229
[45] Date of Patent: Apr. 19, 1988

[54] INTERNAL COMBUSTION ENGINE AIR INTAKE SYSTEM WITH VARIABLE EFFECTIVE LENGTH

[75] Inventors: Hiroki Wada; Kimihide Horio; Kei Abe, all of Toyota, Japan

[73] Assignee: Toyota Jidosha Kabushiki Kaisha, Aichi, Japan

[21] Appl. No.: 805,740

[22] Filed: Dec. 6, 1985

[30] Foreign Application Priority Data

Dec. 10, 1984 [JP] Japan .................. 59-259062

[51] Int. Cl.⁴ .......................................... F02B 27/00
[52] U.S. Cl. ..................... 123/52 MB; 123/52 MV; 123/337
[58] Field of Search ......... 123/52 M, 52 MB, 52 MV, 123/337

[56] References Cited

U.S. PATENT DOCUMENTS

| | | | |
|---|---|---|---|
| 2,235,838 | 3/1941 | Martin | 123/337 |
| 2,315,215 | 3/1943 | Maybach | 123/52 MB |
| 4,527,392 | 7/1985 | Sato et al. | 123/52 MB |

FOREIGN PATENT DOCUMENTS

| | | | |
|---|---|---|---|
| 2831985 | 2/1980 | Fed. Rep. of Germany | 123/52 MB |
| 56-115818 | 9/1981 | Japan . | |
| 57-92021 | 6/1982 | Japan . | |
| 57-110765 | 7/1982 | Japan . | |
| 148023 | 9/1982 | Japan | 123/52 MB |
| 57-156067 | 9/1982 | Japan . | |
| 58-129063 | 9/1983 | Japan . | |
| 59-58736 | 4/1984 | Japan . | |
| 59-130934 | 8/1984 | Japan . | |
| 127850 | 6/1919 | United Kingdom | 123/52 MB |
| 2117043 | 10/1983 | United Kingdom | 123/52 MB |

*Primary Examiner*—Craig R. Feinberg
*Assistant Examiner*—M. Macy
*Attorney, Agent, or Firm*—Finnegan, Henderson, Farabow, Garrett & Dunner

[57] ABSTRACT

An air intake system for internal combustion engine comprises a surge tank the inside of which is divided by a partition wall into two elongated parallel volumetric chambers. The surge tank has a portion extending beyond the branch tube that is located most remote from an air inlet in the tank. The partition wall of the surge tank extension is provided with an aperture for communicating the volumetric chambers with each other. The aperture is opened and closed by a butterfly valve operated by an actuator in response to engine operating conditions, to match the effective length of the intake system with an engine speed. In a preferred embodiment, the surge tank extension provided with the butterfly valve and the actuator forms a valve assembly which is separate from the remainder of the surge tank.

1 Claim, 5 Drawing Sheets

INTERNAL COMBUSTION ENGINE AIR INTAKE SYSTEM WITH VARIABLE EFFECTIVE LENGTH

BACKGROUND OF THE INVENTION

1. Field of the Invention

The present invention relates to an air intake system of an internal combustion engine and, more particularly, to an air intake system which is adapted to vary the effective length thereof in accordance with engine operating conditions.

2. Description of the Related Art

It is well known in the design of an air intake system of an internal combustion engine to cause the resonance frequency of an air column flowing through an air intake system to match the operating frequency of intake valves. The intake air is effectively charged into engine cylinders due to the air column flowing under the effect of inertia, thereby enabling a high output torque of the engine. This type of intake air charging is known as supercharging by inertia.

The resonance frequency of an air column in the intake system is determined by the effective length of the intake system. Usually, the effective length of intake system is constant. In automotive engines, however, the speed of revolution of the engine varies to a considerable extent, so that the speed range is limited in which inertia supercharging can be utilized. If the effective length of an air intake system is selected to be longer for the purposes of obtaining the advantage of inertia supercharging and, hence, a higher output torque at a lower engine speed, then that effective length would be too large for the engine to be supercharged by inertia at a higher engine speed. Conversely, if the effective length of the intake system is matched to a higher engine speed, in order to increase the maximum output of the engine, then it is not possible to improve the output torque at a lower speed.

To overcome this discrepancy, there has been proposed in the prior art an air intake system for use with a 4-valve engine wherein two intake tubes are provided for each cylinder, one of the intake tubes being matched to a higher engine speed and the other to a lower speed (Japanese Unexamined patent publication No. 57-110765). This intake system fails to improve the engine output to a required level because one of the two intake tubes necessarily has a length which is not matched with an actual engine speed.

There have also been proposed intake systems wherein the equivalent effective length of the system is rendered variable in accordance with the rotational speed of the engine. For example, Japanese Unexamined patent publication No. 56-115818, Japanese Unexamined Utility Model publication No. 57-92021, Japanese Unexamined Utility Model publication No. 57-156067, and Japanese Unexamined Utility Model publication No. 59-58736 disclose air intake systems wherein an intake manifold comprises an air inlet tube, an air vessel and a plurality of branched tubes, with the inlet tube being divided into two intake channels. The air vessel is provided with a rotary or slidable valve which functions to divide the inside of the vessel into two chambers communicated respectively with the two intake channels. The valve is adapted to be closed during low speed operation of the engine to separate the inner space of the vessel into two chambers so that, in the intake manifold as a whole, there are formed two separate intake passages; the air being fed to one cylinder group through one intake passage and to the other cylinder group through the other intake passage. This is equivalent to a situation wherein the cross-sectional flow area of the intake manifold is reduced and the effective length of the intake manifold lengthened, whereby the manifold is matched for inertia supercharging at a low engine speed. On the other hand, the rotary or slidable valve is opened in response to the engine operating at a high speed, so that a common unitary space is formed in the air vessel. In this condition, the intake air streams flowing through the two intake channels are first merged together in the common space in the air vessel and the air is then fed therefrom to the cylinders. This results in the effective length of the intake manifold being equivalently shortened so that the manifold is matched for inertia supercharging at a high engine speed.

FIG. 4 of Japanese Unexamined Utility Model publication No. 58-129063 illustrates another air intake system based on a similar principle. In this system, the inside of an air vessel is permanently divided into two volumetric chambers by a longitudinally extending partition wall. One of the volumetric chambers is communicated with one of two groups of engine cylinders through a group of branch tubes, and the other volumetric chamber is connected to another group of cylinders through another group of branch tubes. The partition wall 13 has a port 14, called a balancing passage, which is provided at a location most remote from an air inlet of the vessel; the balancing passage serving to communicate the two volumetric chambers 5A and 5B with each other. A control valve in the form of a poppet valve 11A is provided at the balancing passage 14 and is adapted to be opened at a high engine speed and closed during a low speed operation of the engine. When the poppet valve 11A is closed at a low engine speed, to isolate the volumetric chambers 5A and 5B from each other, intake air is supplied to each cylinder through only one of the volumetric chambers thereby producing the effect of an extended effective length of the intake system. At a high engine speed, the poppet valve is opened to permit the air to flow through the balancing passage from one volumetric chamber to the other, so that the engine cylinders operating on the intake stroke will draw the intake air directly through the corresponding volumetric chamber, on the one hand, and a certain amount of air flowing from the other volumetric chamber through the balancing passage into the corresponding chamber, on the other hand. This will produce the effect of a shortened effective length of the intake system and reduce the flow resistance thereof, thereby improving the output torque at a high engine speed.

However, the problem of this intake system is that the use of a poppet valve necessarily results in a limiting of the dimension of the balancing passage, so that it is difficult during the high speed operation of the engine to ensure an air communication between the two volumetric chambers free enough to permit an adequate amount of air to pass through the balancing passage. This hinders a full enjoyment of the effect of the shortened effective length of the intake system at a high engine speed.

Another disadvantage is that when the poppet valve is opened, it remains situated opposite the balancing passage and in the close vicinity thereof so that the stream of air flowing through the passage is obstructed by the opened valve, thereby increasing the flow resistance through the intake system. A further disadvantage is the difficulty of machining the balance passage due to the passage being located at one of the branch tubes.

SUMMARY OF THE INVENTION

The object of the present invention is to overcome the foregoing problems. More particularly, an object of the invention is to improve the air intake system of the type just described such that an sufficient amount of air is permitted to flow between the two volumetric chambers at an engine high speed operation.

Another important object of the present invention is to provide an air intake system which is easy to manufacture and assemble and facilitates the maintenance and repair thereof.

This invention provides an air intake system for use in a multi-cylinder engine having two groups of engine cylinders. The intake system includes a surge tank and a plurality of branch tubes extending therefrom. The surge tank comprises an elongated hollow shell, the inside of which is divided by a partition wall into two juxtaposed elongated volumetric chambers which are communicated with each other by an aperture formed through the partition wall. A flow control valve operated by an actuator responsive to engine operating conditions is provided to open and close the aperture in the partition wall. According to the invention, the shell and the partition wall comprise, respectively, a shell extension and a partition wall extension that extend beyond the branch tube which is located most remote from the air inlet in the shell. The aperture is provided in this partition wall extension. The flow control valve comprises a butterfly valve which is accommodated within the extension of the shell.

Use of a butterfly valve enables a considerable increase of the flow area of the aperture as compared with a poppet valve. The butterfly valve when opened assumes a position perpendicular to the aperture. Thus, the use of a butterfly valve in combination with the location of the aperture and the valve downstream of the intake tube which is located most remote from the air inlet, enable the air flowing into the most remote branch tube to pass through the aperture without being obstructed by the butterfly valve. Thus, it is possible to reduce the flow resistance of the system at a high speed operating condition of the engine.

In the preferred embodiment of the invention, the surge tank extension having the butterfly valve is in the form of a valve assembly which is separate from the main body forming the remainder of the surge tank. With this arrangement, the valve seat for the butterfly valve can be machined extremely easily and at reduced cost, because the separate valve assembly is relatively small in size and is easy to mount on a machine tool for machining of the valve seat. Otherwise, it would be necessary to mount the entire surge tank on a machine tool such as a lath and turn the large workpiece during machining. The feature of separate valve assembly also facilitates maintenance of the component parts thereof and the assembly as a whole may even be replaced with a new one where required.

DESCRIPTION OF THE PREFERRED EMBODIMENTS

Figure 1:
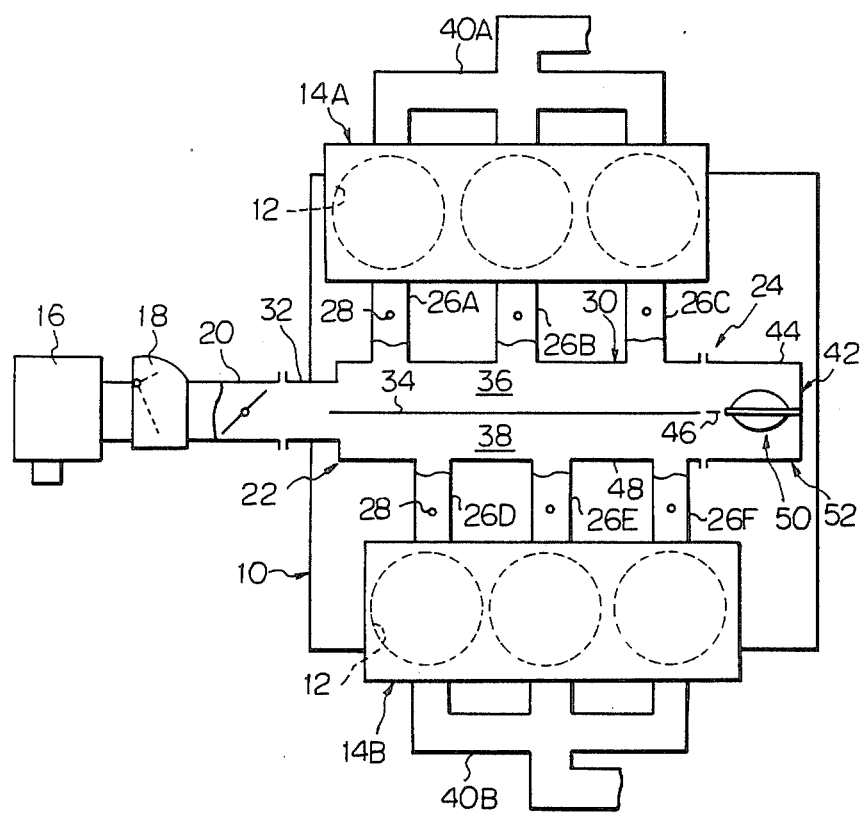
FIG. 1 is a schematic representation of a V-6 engine having an air intake system according to the present invention, with part of the system cut away to show the interior arrangement.

Referring to FIG. 1, there is schematically shown a V-6 engine 10 having two cylinder banks 14A and 14B, with each bank having three cylinders shown by dotted circles 12. Air to the respective cylinders 12 is fed via an air cleaner 16, an airflow meter 18, throttle body assembly 20, and an air intake system 22 according to the present invention. The intake system 22 comprises a common surge tank 24 and a plurality of branch tubes 26A-26F integral therewith or made separate therefrom. The surge tank is defined as an air plenum for distributing an intake air to respective intake tubes and for suppressing any pressure fluctuation therein due to air drawn intermittently into particular cylinders. Each of the intake tubes 26A-26F has a fuel injector 28 mounted thereto in a conventional manner, for cyclically injecting a controlled amount of fuel into the air stream drawn through the intake tube into combustion chambers of the respective cylinder 12 to form a combustible mixture.

The surge tank 24 comprises an elongated hollow shell 30 extending longitudinally of the engine 10 and has an air inlet 32 provided at the upstream end thereof for connection with the throttle body 20. The surge tank 24 further comprises a partition wall 34 extending longitudinally from the upstream end to the downstream end of the tank to divide the inside of the surge tank into two volumetric chambers 36 and 38. The first volumetric chamber 36 is communicated with the combustion chambers of the first cylinder bank 14A through corresponding intake tubes 26 while the second volumetric chamber 38 is connected to the combustion chambers of the second cylinder bank 14B. Exhaust manifolds 40A and 40B are provided for respective cylinder banks 14A and 14B.

As shown in FIG. 1, the surge tank 24 comprises an extension 42 that extends in a direction opposite to the air inlet 32 beyond the intake tube 26F which is located most remote from the air inlet 32. This surge tank extension 42 includes a shell extension 44 and a partition wall extension 46, the wall extension 46 being partly and schematically shown in FIG. 1. According to the preferred embodiment of the invention, the surge tank extension 42 is made separate from the main body 48 forming the remainder of the surge tank 24 and is rigidly secured in a detachable manner to the main body 48 by way of suitable fastening means such as bolts, as described later. The extension 42 and the main body 48 form together the entire surge tank 24. As described later with reference to FIGS. 2 through 4, the partition wall extension 46 has an aperture which is opened and closed by a butterfly valve 50. The shell extension 44 and the wall extension 46 of the surge tank extension 42, the butterfly valve 50, and an actuator therefor (not shown in FIG. 1) together form a valve assembly 52.

The valve assembly 52 will be described in more detail with reference to FIGS. 2 through 4. The valve assembly 52 has a housing which is the shell extension 44. The inner space of the housing 44 is divided by the integral wall extension 46 into two chambers forming part of the aforementioned volumetric chambers 36 and 38. The partition wall extension 46 has a circular aperture 54 serving to communicate the volumetric chambers 36 and 38 with each other at their downstream end. In order to facilitate machining of the aperture 54, the side wall of the housing 44 is provided with an opening 56 which is closed by a removable cover plate 60 secured to the housing by, for example, three screws 58. The aperture 54 in the partition wall extention 46 is opened and closed by the butterfly valve 50, which includes a valve shaft 62 journaled to the housing 44 and a closure member 64 fixed thereto.

A vacuum operated actuator 66 is provided for controlling the opening of the butterfly valve 50. The actuator 66 has a split housing 70. The housing 70 comprises two half-sections holding a diaphragm 68 sandwiched therebetween. The inside of the housing 70 is divided by the diaphragm 68 into a subatmospheric or vacuum chamber 72 and an atmospheric chamber 74. The diaphragm 68 is biased toward the atmospheric chamber 74 by a coil spring 76. The vacuum chamber 72 is connected through an inlet 78 and a suitable hose to a conventional vacuum control device (not shown) which is adapted to control the magnitude of partial vacuum applied to the vacuum chamber 72 substantially in reverse proportion to the rotational speed of the engine. An end of an output rod 80 is secured to the diaphragm 68, the other end thereof being linked to an end of a lever 84 pivoted at 82 to the housing 44. The other end of the lever 84 is articulated to an end of a connecting rod 86, the other end of which rod 86 is pivotally connected to an arm 88 secured to an outer end of the valve shaft 62. The closed position of the closure member 64 is adjusted by a stop 90 abutting against an adjusting screw 92 and provided at an end of the arm 88.

Figure 4:
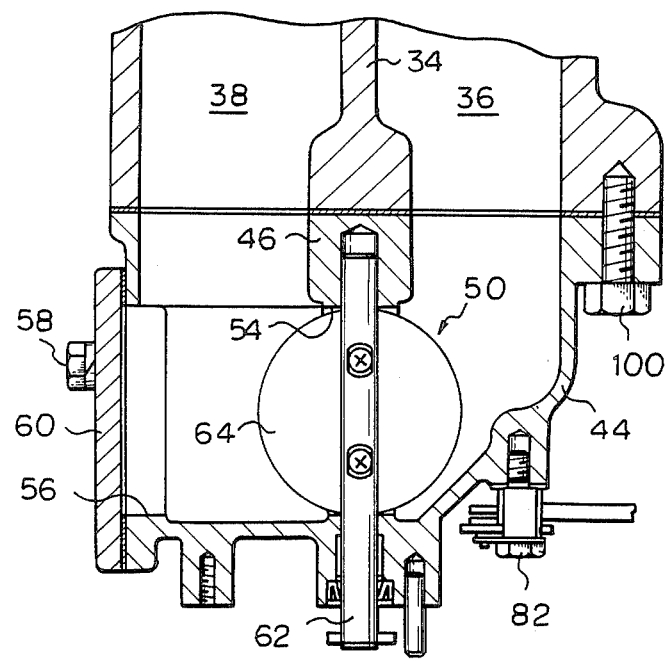
FIG. 4 is a cross-sectional view taken along the line IV—IV of FIG. 3, with the actuator omitted.

With this arrangement, when the magnitude of partial vacuum in the vacuum chamber 72 increases in response to the engine operating at a low speed, the diaphragm 68 is pulled to the right as viewed in FIG. 4 causing the arm 88 to rotate in the anticlockwise direction, as shown by the chain line, whereby the aperture 54 in the partition wall extension 46 is closed by the closure member 64 of the butterfly valve 50. As the volumetric chambers 36 and 38 of the surge tank 24 are thus disconnected from each other, the air to the fist cylinder bank 14A is drawn only through the first volumetric chamber 36 and the air to the second cylinder bank 14B only through the second volumetric chamber 38. As a result, the intake system functions in the same manner as it would if it had a long effective length, thereby enabling supercharging by inertia at a low engine speed.

Figure 3:
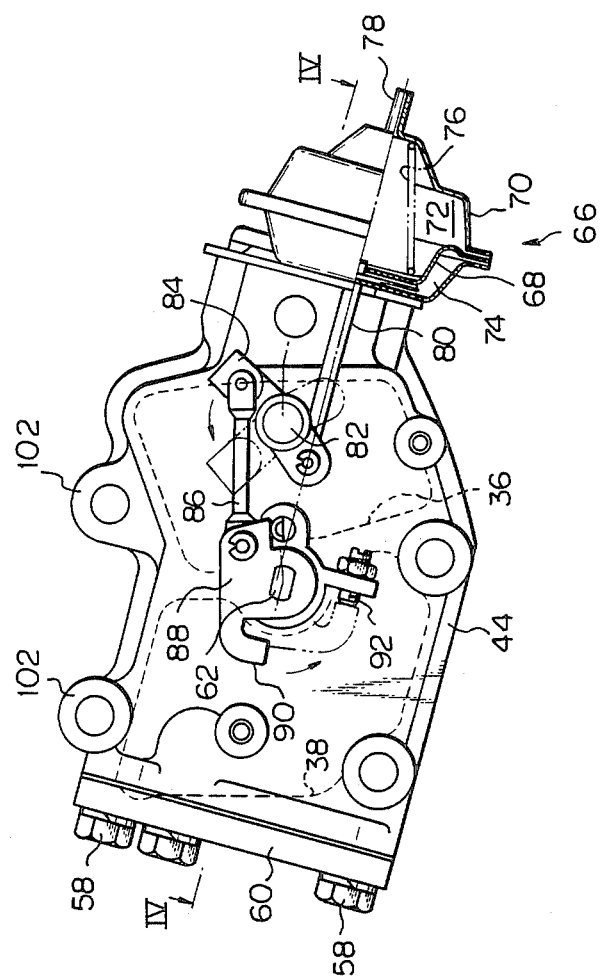
FIG. 3 is a side elevational view of the valve assembly shown in FIG. 2, with the protecting cover removed and the actuator housing partly cut away.

Conversely, if the engine speed increases and the magnitude of partial vacuum in the vacuum chamber 72 is decreased, then the diaphragm 76 is moved by the action of the spring 76 to assume the position shown in FIG. 3, thereby causing the butterfly valve 50 to swing into the wide open position shown in FIG. 4. In this position, the air in either of volumetric chambers 36 and 38 is free to flow through the aperture 54 into the other volumetric chamber, so that any cylinders moving on an intake stroke will be supplied with intake air via both volumetric chambers 36 and 38. The result of this is the same as if the effective length of the intake system had been shortened, thereby enabling the intake system to match the inertia supercharging at a high engine speed. It should be noted that, in the fully opened position of the valve 50, the cross-sectional flow area of the surge tank 24 becomes twice that of the respective volumetric chambers 36 and 38, to reduce the flow resistance and pressure drop across the surge tank. This contributes to an enhancing of the engine output at a high speed.

Moving the valve 50 into an intermediate position between the fully opened and the fully closed position will cause the intake system to match the moderate engine speed.

Figure 2:
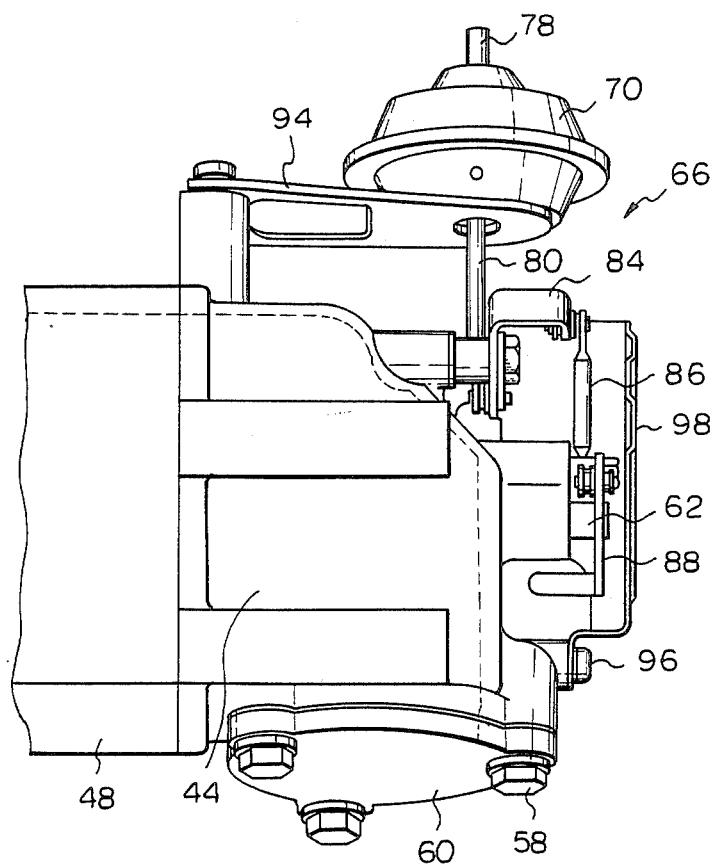
FIG. 2 is a perspective view of the valve assembly as attached to the main body of the surge tank, with the fastening bolts omitted.

As is apparent from FIG. 2, the housing 70 of the actuator 66 is supported by a bracket 94 bolted to the valve assembly housing 44. The linkage of the actuator 66 is protected by a cover 98 secured to the housing 44 by screws, one of which is shown at 96 in FIG. 2. The thus-assembled valve assembly 52 is fastened to the surge tank main body 48 by, for example, five bolts, one being shown at 100 in FIG. 4. Toward this end, the housing 44 of the valve assembly has a plurality of bosses 102 provided with through openings.

Figure 5:
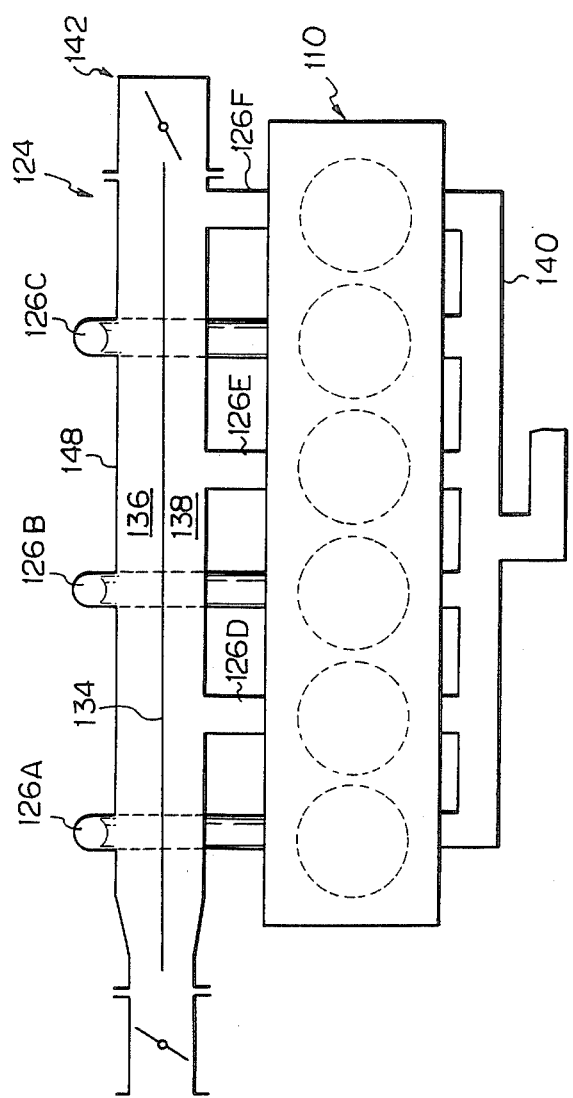
FIG. 5 is a schematic representation of an in-line engine having an air intake system according to the present invention.

The intake system according to the invention has been described hereinbefore as mounted to a V-6 engine. However, the present invention may be equally applied to an air intake system for use with an in-line engine. FIG. 5 illustrates schematically an example of such application. In this case also, the surge tank 124 is shown as comprising a main body 148 and an extension 142, the extension 142 being made in the form of a valve assembly similar to that described with reference to FIGS. 2 through 4. Similar to the arrangement shown FIG. 1, the inside of the surge tank 124 is divided by a partition wall 134 into two volumetric chambers 136 and 138. The second chamber 138 is connected by relatively short intake tubes 126D-126F to the second, fourth, and sixth cylinders, while the first chamber 136 is communicated with the first, third, and fifth cylinders through intake tubes 126A-12C extending under the surge tank 124. An exhaust manifold 140 is mounted to the engine 110 at the side opposite to the intake system. Operation of the intake system of this embodiment is the same as the first embodiment and the equivalent effective length thereof varies according to engine speed.

In summary, the primary feature of the present invention is that the surge tank comprises an extension that extends beyond the intake tube located most remote from the air inlet, with the aperture for communicating the two volumetric chambers being provided in the wall extension of the surge tank extension. Another important feature is that the valve for controlling the aperture comprises a butterfly valve. The use of the butterfly valve permits the closure member to swing into a position parallel to the air stream flowing through the aperture in a fully open position of the valve, thereby ensuring an unobstructed air flow through the aperture and avoiding pressure drop. It should be also appreciated that the provision of the aperture and the butterfly valve at the extension of the surge tank prevents the air stream flowing into the most downstream intake tube from impinging upon the opened closure member. Furthermore, use of a butterfly valve enables a ready increase of the cross-sectional area of the aperture in the partition. These features serve in combination to considerably reduce the flow resistance of the system at an elevated engine speed and contribute to an improvement of the maximum engine output.

Designing the surge tank extension as an independent valve assembly separate from the surge tank main body leads to various additional advantages. The valve assembly is small in size as compared to the entire surge tank and is free from the intake tubes. This permits the valve assembly to be readily mounted on a machine tool for machining of the aperture in the partition wall. The separate valve assembly may be easily dismounted from the engine for inspection and maintenance, and where appropriate, a damaged valve assembly may be replaced at reasonable cost.

Although the present invention has been described herein with reference to the particular embodiments thereof, it is to be understood that the invention is not limited thereby and various changes and modifications may be made therein for those skilled in the art within the scope of the invention.

We claim:

1. An air intake system for feeding intake air to combustion chambers of a multicylinder internal combustion engine having two groups of longitudinally spaced engine cylinders, the system comprising:

a. a longitudinally extending surge tank positioned adjacent said engine cylinders, said surge tank including:

a main portion having an elongated hollow main shell, a longitudinal partition wall dividing the interior of said main shell into a pair of juxtaposed elongated volumetric chambers, and a plurality of branch tubes connecting each of said volumetric chambers to said combustion chambers of one of said two groups of engine cylinders, said main portion of said surge tank having an upstream end and a downstream end, said upstream end having an air inlet for admitting intake air to be drawn into both of said volumetric chambers, and an extension portion detachably mounted on said downstream end of said main portion, said extension portion including a shell extension contiguous with said main shell and a wall extension contiguous with said partition wall, said wall extension having an aperture for providing flow communication between said volumetric chambers downstream of said branch tubes, said shell extension including an opening aligned with said aperture in said wall extension and a removable cover plate for covering said opening;

b. flow control valve means for opening and closing said aperture, said flow control valve means including a butterfly valve pivotally mounted in said aperture of said wall extension of said extension portion; and c. actuator means responsive to engine operating conditions for controlling opening and closing of said butterfly valve to vary the extent of flow communication between said volumetric chambers through said aperture, thereby varying the effective length of said intake system with engine operating conditions.

* * * * *